(12) United States Patent
Chelvayohan et al.

(10) Patent No.: US 7,693,329 B2
(45) Date of Patent: *Apr. 6, 2010

(54) BOUND DOCUMENT SCANNING METHOD AND APPARATUS

(75) Inventors: Mahesan Chelvayohan, Lexington, KY (US); Khagehwar Thakur, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 1588 days.

This patent is subject to a terminal disclaimer.

(21) Appl. No.: 10/883,429

(22) Filed: Jun. 30, 2004

(65) Prior Publication Data

US 2006/0007505 A1 Jan. 12, 2006

(51) Int. Cl.
*G06K 9/00* (2006.01)
*H04N 1/40* (2006.01)

(52) U.S. Cl. .................................. 382/173; 358/448

(58) Field of Classification Search ............... 382/164, 382/171, 173, 176, 199, 232, 236, 283, 260, 382/264; 358/1.9, 448, 464; 348/135, 586, 348/596
See application file for complete search history.

(56) References Cited

U.S. PATENT DOCUMENTS

| | | | | |
|---|---|---|---|---|
| 5,956,468 A | * | 9/1999 | Ancin | 358/1.9 |
| 6,075,905 A | * | 6/2000 | Herman et al. | 382/284 |
| 6,222,947 B1 | * | 4/2001 | Koba | 382/284 |
| 7,079,686 B2 | * | 7/2006 | Ahmed et al. | 382/176 |
| 7,409,086 B2 | * | 8/2008 | Bai et al. | 382/173 |

* cited by examiner

*Primary Examiner*—Duy M Dang (57) ABSTRACT

A method, and an apparatus employing the method, of scanning a bound document. The method includes the acts of acquiring image data of the document that has an image attribute, identifying from the image data a group of image data that has the first image attribute, and modifying the group of image data having the first image attribute with a second image attribute.

35 Claims, 6 Drawing Sheets

BOUND DOCUMENT SCANNING METHOD AND APPARATUS

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Filed of the Invention

The invention relates to processing of scanned images, and particularly, to processing of scanned images of bound documents.

2. Description of the Related Art

When a document with a binding is scanned on a flat bed scanner, the scanned image often appears to have a darker area near the binding. Various factors contribute to the appearance of the darker area. For example, the binding of the document usually "lifts off" of or is separated from the scanner platen. That is, curvature near the binding geometrically distorts the image being scanned. As a result, contents within the distorted image are also geometrically distorted and heavily shaded because the lifted portion of the document reflects less light back into the scanner, thereby causing the lifted portion appear to be darker. The relatively darker portion of the scanned document is often considered to have an unpleasant affect on the scanned image.

Furthermore, when the scanner cover only partially covers the document, or when the cover is completely open, areas adjacent to the image being scanned usually are very dark, and form an unpleasant looking image border around the image. In still other cases, a partial image of an unwanted adjacent page is sometimes inadvertently captured, and again forms another dark edge in the image near the binding. In addition, when the document is scanned, an operator may place unequal pressure on parts of the document. In such a case, the image being scanned may be skewed.

SUMMARY OF THE INVENTION

Accordingly, the invention provides a method of scanning a bound document. The method includes the acts of acquiring image data of the document that has background attributes such as a dark background attribute, and locating the image data that has the dark background attribute. Thereafter, the method includes the acts of removing the dark background attribute from the located image data, and refilling the located image data with image data having a different background attribute.

In another form, the invention provides a method of scanning a bound document. The method includes the act of acquiring image data of the document. The image data can include at least one image attribute. Thereafter, the method includes the acts of identifying from the image data a group of image data that has a first image attribute, and modifying the group of image data that has the first image attribute to provide a second image attribute for the group of image data.

In another form, the invention provides a method of scanning a bound document. The method includes the acts of acquiring image data of the document such as a background value, and determining a plurality of feature points based on the background values. Thereafter, the method includes the acts of deriving a distortion ramp based on the feature points, and modifying the image data based on the distortion ramp.

In another form, the invention provides a document scanner for scanning a bound document. The document scanner includes an image scanning apparatus to acquire image data of the document that has at least one image attribute, and an image identifier to identify from the image data a group of image data having a first image attribute. The document scanner also includes an image modifier to modify the group of image data that has the first image attribute with a second image attribute.

In another form, the invention provides document scanning software for scanning a bound document. The document scanning software includes image scanning software code to acquire image data of the document, the image data having at least one image attribute, and image identifier software code to identify from the image data a group of image data having a first image attribute. The document scanning software also includes an image modifier software code to modify the group of image data having the first image attribute with a second image attribute.

Other features and advantages of the invention will become apparent to those skilled in the art upon review of the following detailed description, claims, and drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. In addition, the terms "connected" and "coupled" and variations thereof are not restricted to physical or mechanical connections or couplings.

In some embodiments, the invention provides a scanning method to enhance the scanned image of a bound document having a binding. The scanning method initially finds a background, a plurality of page boundaries, and a plurality of distortion estimates of the image being scanned. Thereafter, the scanning method removes the background, fixes the distortions, trims unwanted content and de-skews and re-centers the remaining image.

Figure 1:
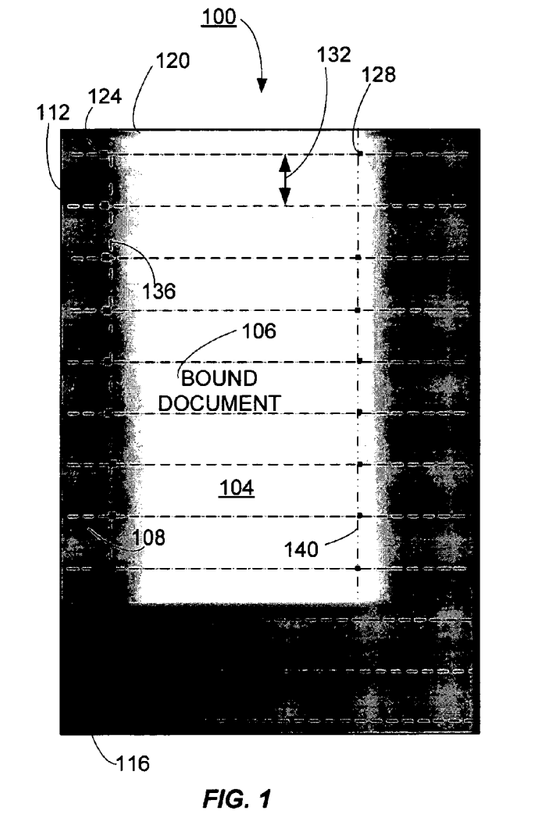
FIG. 1 illustrates a scanned image of a page of a bound document.

FIG. 1 illustrates a scanned image 100 of a bound document 104 having some text 106. The scanned image 100 of the bound document 104 has a darker area 108 due to uneven curvatures of the bound document near a binding 112 during a scanning operation. FIG. 1 also shows that the text 106 of the bound document 104 is blocked or distorted near the darker area 108. Although the darker area 108 is shown being almost symmetrical, the darker area 108 can also be slightly more irregularly shaped in practice. Furthermore, a scanner cover artifact 116 due to a partially opened scanner cover is also illustrated in FIG. 1. The scanned image 100 of the bound document 104 also has document artifact 120 when more pressure is placed on one area of the bound document 104 during the scanning operation. This uneven pressure also distorts the dimensions of the scanned image 100. If the scanned image 100 is not processed, the artifacts 116 and 120 that are considered unpleasant looking will also be printed as part of the scanned image 100.

Figure 2:
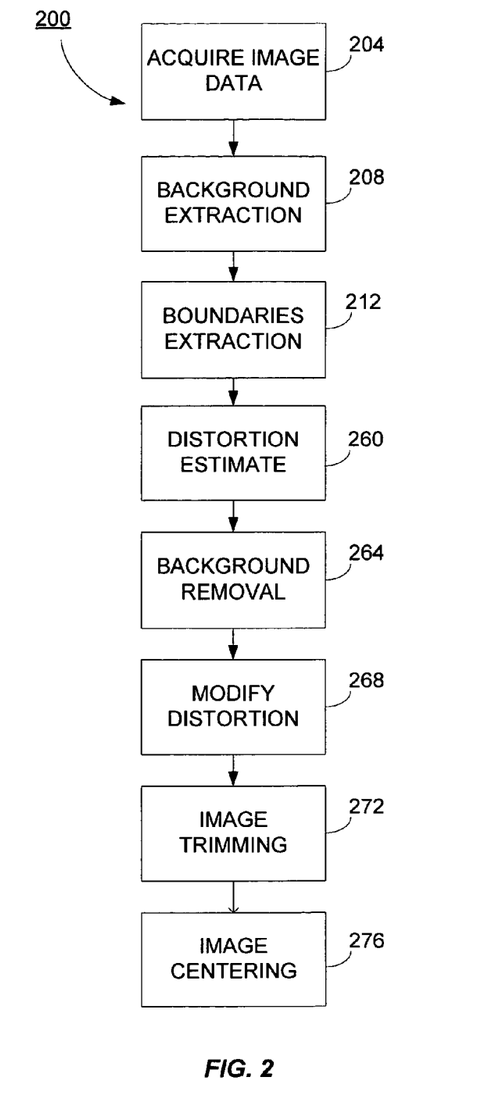
FIG. 2 shows a flow chart of a scanning enhancement process embodying the invention.

FIG. 2 shows a flow chart 200 of the invention. Once the scanned image 100 has been acquired by a scanning apparatus (not shown) at block 204, a plurality of image attributes such as background values are extracted from the scanned image at block 208. Background values are typically extracted by morphological methods. For example, processes such as erosions and dilations can be used to extract the background values from the scanned image 100. Other techniques such as the rank leveling method can also be used. Although the scanned image 100 is described as acquired by the scanning apparatus, the scanned image 100 can also be stored in a memory coupled to a computer. In such a case, the scanned image 104 is processed and enhanced by the computer with processes as shown in flow chart 200.

Referring back to FIG. 2, at block 208, background extraction, image attributes such as luminance are extracted from neighboring pixels of the scanned image 104. Each pixel is replaced by the highest luminance value detected from the neighbor pixels. Depending on the resolution of scanned image 104, background extraction at block 208 can become computing intensive as the image resolution increases. Therefore, a maximum limit on the scanned image resolution is set such that if the scanned image resolution is higher than the maximum limit, a lower resolution image is first created, and the background values are subsequently extracted. Thereafter, the scanned image 100 is scaled back to the original higher resolution. Further, only the luminance values are used in the background extraction for better efficiency in some embodiments.

After the background values are extracted from the scanned image 100 at block 208, an almost blank background image is obtained. In such a case, the text 106 of the scanned image 100 are typically filtered out. Page boundaries are derived or extracted from the background image at block 212. Page boundaries such as the left edge, the right edge, the top edge and the bottom edge of the background image are then determined as shown in FIG. 3.

Figure 3:
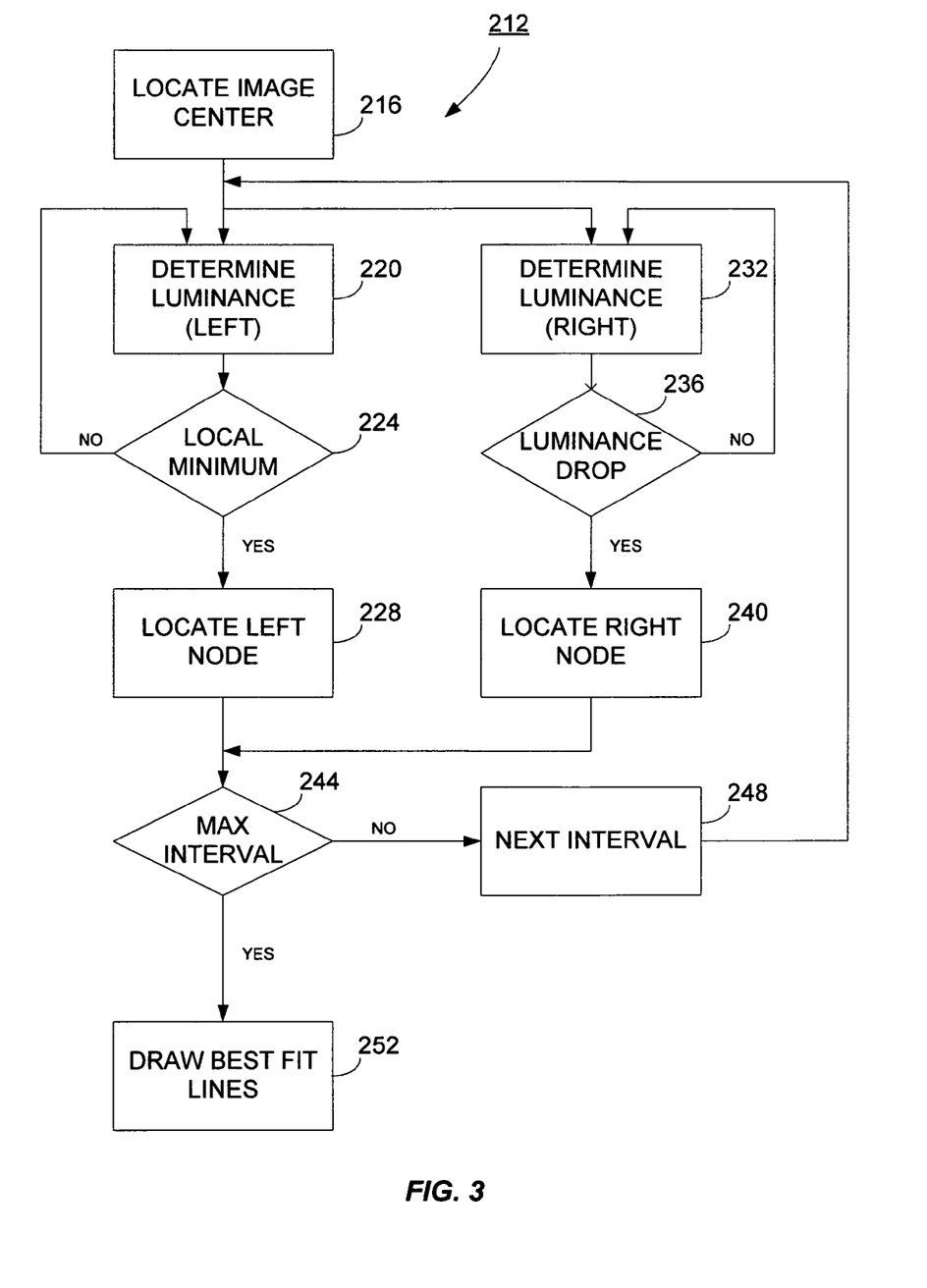
FIG. 3 shows a flow chart of a background extraction process embodying the invention.

FIG. 3 shows a detailed flow chart of block 212. Generally, the left and right edges are found based on their typical profiles. For example, a center of the background image is first determined at block 216. By measuring the luminance values at block 220, the left edge or the left boundary of the background image is characterized by decreasing the luminance values when measured from the center to the left. The decreasing luminance values or a downward soft luminance ramp will reach a luminance value minimum or a darkest point (determined at block 224), followed by increasing luminance values or an upward soft luminance ramp. Like the rest of the darker area 108, the luminance minimum is also caused by the curvature near the binding 112. The detected minima are then marked at block 228, and shown as a first node 124 in FIG. 1. Of course, other luminance measuring directions can also be used. For example, the luminance values can also be measured from the left of the scanned image 100 until a minimum is reached. In such a case, the luminance values of the first few pixels can be bypassed to allow efficient processing, because the minimum is unlikely to appear in the first few pixels. Also, when measuring the luminance values from the center to the left, a local luminance minimum that occurs too close to the center (measured by a pixel threshold) can also be bypassed because the local luminance minimum is likely caused by a residual effect of the background extraction at block 208.

Similarly, referring back to FIG. 3, the right edge or the right boundary of the background image is characterized by a drop of luminance values. Specifically, the right edge is marked by measuring the luminance values from center to right at block 232. When a predetermined luminance threshold is crossed by the luminance drop within a predetermined number of pixels, determined at block 236, a right edge is marked at block 240, and shown as a second node 128 in FIG. 1.

The left and right edge marking processes 220 and 232 are then repeated for the entire scanned image 100. The first nodes 124 and the second nodes 128 found are then collectively referred to as feature points. Depending on the scanned image resolution, the left and right edge marking processes 220 and 232 are then repeated for a maximum number of preset pixel intervals 132 (of FIG. 1). Once the maximum number of preset pixel intervals has been reached as determined at block 244, the left and right edge marking processes 220 and 232 stop. Otherwise, the left and right edge marking processes 220 and 232 are repeated for the next interval determined at block 248. Once all the intervals have been exhausted, a left best-fit line 136 (FIG. 1) is obtained for the first nodes 124 found. Similarly, a right best fit line 140 (FIG. 1) is also obtained for the second nodes 128 found. The best-fit lines 136 and 140 can be obtained in a manner known in the art, such as least square error techniques. Furthermore, depending on factors such as resolution, background extraction, and the like, some right edge feature points may be skipped or missed for some intervals. When the maximum number of intervals is used, missing feature points can be acceptable.

The top and bottom edges are also found in a similar manner. That is, the top and bottom edges are determined for a number of intervals starting from the center to top, and to the bottom, respectively. In this way, the feature points found form a population of points with four sets of best-fit lines and four edge dimensions. While it is likely that the four edge dimensions are different due to image distortion, the population of the feature points can also help to indicate a document orientation.

Figure 4:
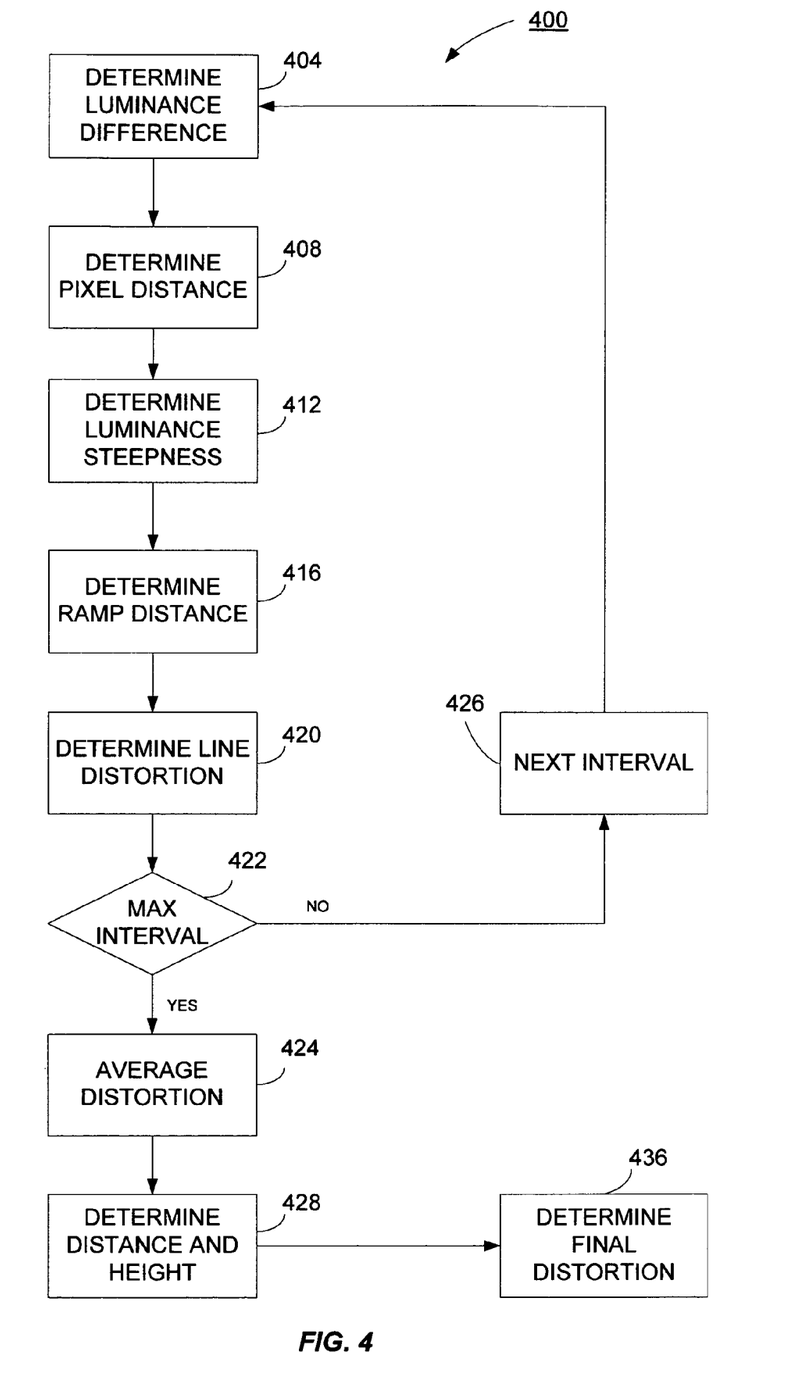
FIG. 4 shows a flow chart of distortion estimation embodying the invention.

Referring back to FIG. 2, after the edges or the boundaries have been determined at block 212, distortions within the scanned image 100 are determined at block 260. FIG. 4 shows a flow chart for distortion estimation 400 of the invention. Distortions are estimated by determining a rate of change of the luminance values, sometimes referred to as a luminance steepness, from the luminance values determined earlier. Generally, a large rate of change of the luminance values can indicate a sharp curvature, and therefore more distortions are expected. In some embodiments, a luminance value difference is determined for each interval near the first node 124 (of FIG. 1) at block 404. By reversing the downward soft ramp determined at block 220, an edge pixel corresponding to an edge of the darker area 108 of FIG. 1 is determined. For example, the edge pixel of the darker area 108 can be located when the luminance values of adjacent pixels being examined remain within some minimum luminance difference thresholds. The luminance value of the edge pixel is then compared to the pixel corresponding to the first node 124 to obtain the luminance value difference. Thereafter, the number of pixels from the edge pixel to the pixel corresponding to the first node 124 is determined at block 408 to obtain a pixel distance. The rate of change of the luminance values is determined by dividing the luminance value difference by the pixel distance at block 412.

The distortions are also characterized by locations at which the changes of luminance values occur, or sometimes referred to as a luminance ramp distance, which is determined at block 416. If the luminance ramp is near the center, distortions are considered minimal. If the luminance ramp is far from the center, there will be large distortions. If the rate of change of the luminance values is S and the distance of the luminance ramp from the center is L, a distortion D is given by:

$$D = W_S \times S + W_L \times L, \quad \text{(EQN. 1)}$$

where two weights $W_S$ and $W_L$ are generally determined empirically. The distortions are measured at all of the intervals. At block 422 it is determined if the maximum number of intervals has been reached. If this has occurred, an average of the distortions ($D_{AV}$) is subsequently found at block 424. If not, at block 426 the next interval is retrieved and the process returns to block 404 for the new interval.

Since artifacts 120 (of FIG. 1) can also cause scanned image distortions, the distortions due to artifacts are also measured. For example, artifacts 120 can cause the top edge to appear to be wider than the bottom edge because the bound document was likely pressed more on top during the scanning operation. In such a case, a compensation for the normal distance between the left best fit line 136 and the right best fit line 140 are used for reducing the distortions. Specifically, $Dist_{MAX}$, which is defined as a maximum distance derived from the distances found between the left best fit line 136 and the right best fit line 140 for the number of intervals 132 used, is determined at block 428. Thereafter, Dist(h), which is defined as a distance between the left best fit line 136 and the right best fit line 140 at height h measured from the maximum distance, is also determined at block 428. Once $Dist_{MAX}$ and Dist(h) have been determined, a final distortion given by the following equation (EQN. 2) is determined at block 436.

$$D_{FINAL}(h) = D_{AV} + Dist_{MAX} - Dist(h) \quad \text{(EQN. 2)}$$

The final distortions at different heights are then applied to the scanned image 100, detailed hereinafter.

Referring back to FIG. 2, after the distortions are estimated at block 260, the background determined at block 208 is removed at block 264. Many methods can be used to remove the background from the original scanned image 100. For example, the background can simply be subtracted from the scanned image 100. The background can also be removed by transforming the luminance value of the pixels of the scanned image 100 to an output luminance $Y_{OUT}$ as follows:

$$Y_{OUT} = \frac{Y_{IN} \times Y_{MAX}}{Y_{BG}}. \quad \text{(EQN. 3)}$$

where $Y_{IN}$ is a luminance value of the pixel being examined, $Y_{BG}$ is a background luminance, and $Y_{MAX}$ is the maximum luminance of the scanned image 100 which is typically 255. In this way, the text 106 is kept in the scanned image 100, while most of the dark areas 108 and 116 are filtered out. Histogram stretching is also typically used to further enhance the contrast of the scanned image 100 after its background has been removed.

Figure 5:
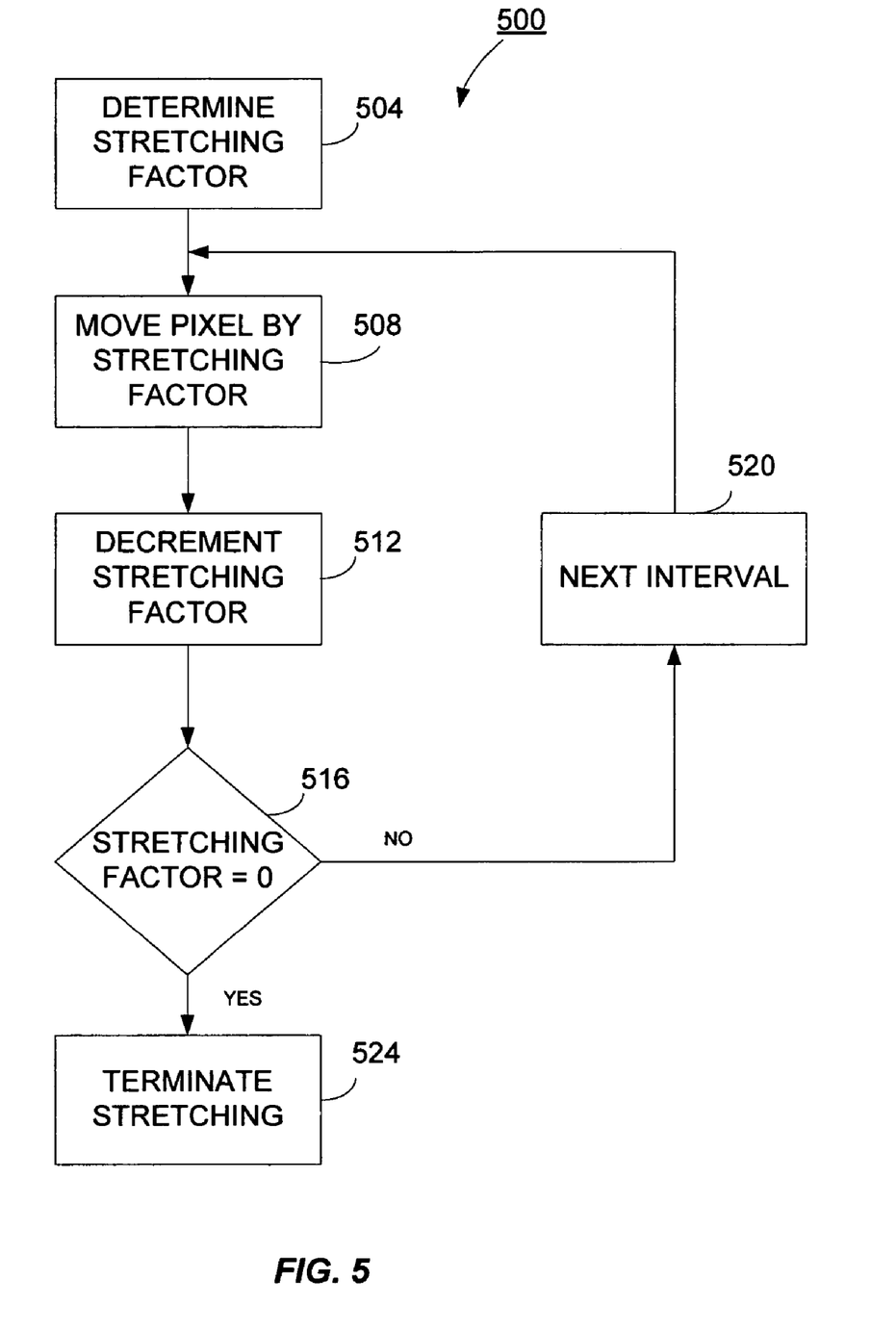
FIG. 5 shows a flow chart of distortion modification embodying the invention.

The distortions determined earlier are then modified or fixed at block 268. FIG. 5 shows a flow chart of distortion modification 500. In general, distortions are fixed by stretching the image to one side of the document 104. Using EQN. 2, a maximum amount of stretching factor ($S_{MAX}$) for current height can be determined. That is, $S_{MAX}(h)$ is set to equal $D_{FINAL}(h)$ at block 504. Assuming that the binding 112 and so the darker area 108 are on the left edge of the scanned image 100, the pixels on the left boundary near the first nodes 124 or the left best fit line 136 are moved further to the left. Specifically, each pixel near the left best fit line 136 is moved to the left by $S_{MAX}(h)$ number of pixels at block 508. The stretching factor is then reduced by a preset fraction at block 512, for example, $S = S_{MAX}(h)/F$, and the pixel to the right is moved to the left by S pixels, where F determines how fast the stretching stops and can be made dependent on the steepness described earlier. The stretching process is repeated until S=0, determined at block 516. If S≠0, at block 520 the next interval is obtain and the process repeats for that interval at block 508. If S=0, stretching is terminated at block 524 and the process returns to process 200 at block 272. After the distortions are modified or fixed at block 268, the scanned image 100 is trimmed and centered at blocks 272 and 276, respectively.

Figure 6:
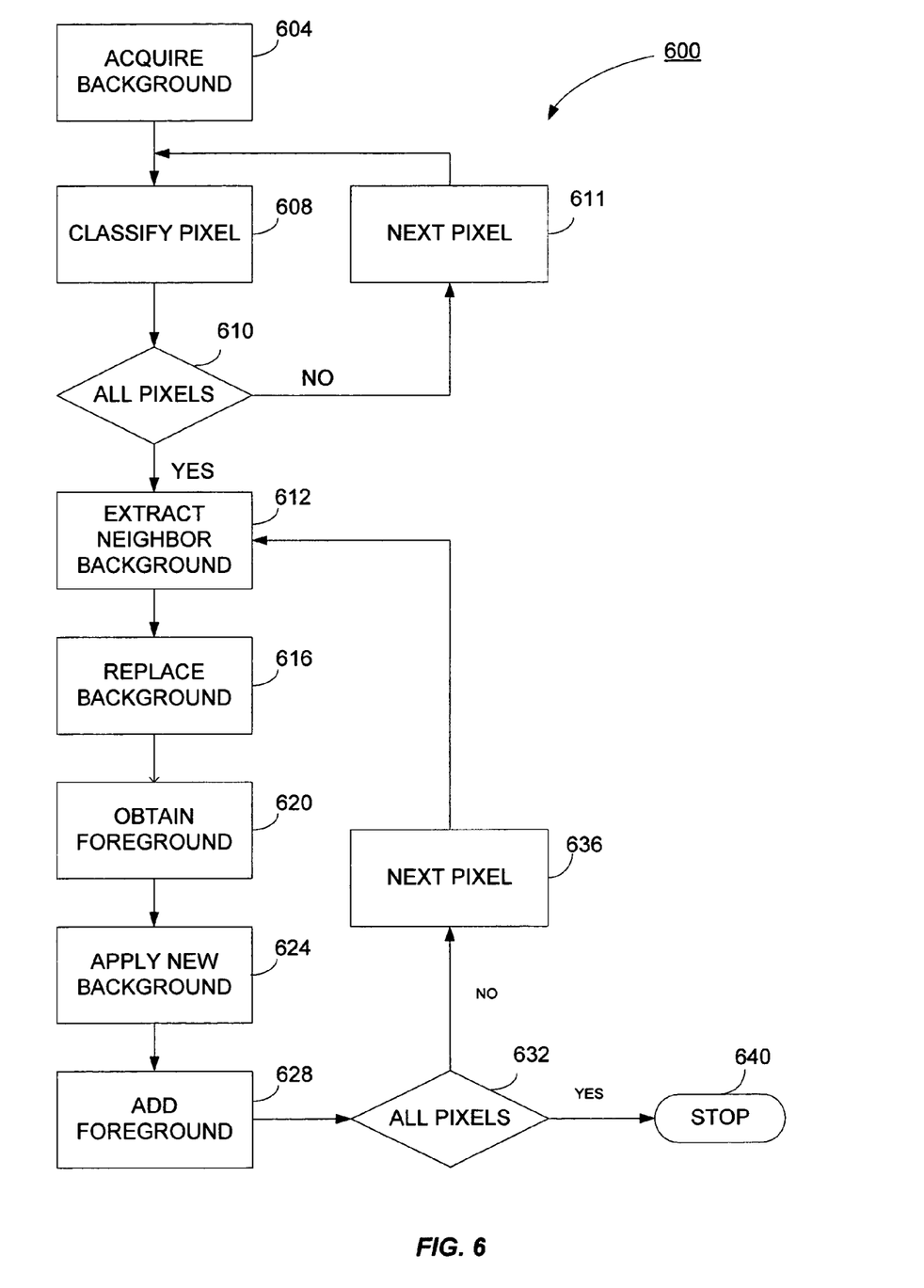
FIG. 6 shows an alternative enhancement process embodying the invention.

FIG. 6 shows a flow chart 600 of another embodiment of the flow chart shown in FIG. 2. The embodiment shown in FIG. 6 generally identifies the darker areas such as area 108 when compared to the rest of the document 104 and corrects for the darkness. After the correction, the entire scanned image will have a uniform background. Specifically, after the background values have been determined at block 604 (or block 208 of FIG. 2) for each color, at block 608 each pixel is classified as being either a background pixel if the luminance value is at or above a predetermined threshold or a dark pixel if it is below that threshold based on the background value determined. At block 610 it is determined if all pixels have been classified, if not at block 611 the next pixel is retrieved and the process returns to block 608. Thereafter, at block 612, an average background value is derived from the background pixels in the neighborhood of or around the pixel being examined. Each dark pixel is then replaced with the determined background value at block 616 to essentially obtain a blank page. At block 620, a foreground is then obtained by subtracting the determined background value from the scanned image 100. At block 624, a new background is then applied to all pixels of the scanned image 100. The new background can be obtained from the non-dark region of the original scanned document. Thereafter, the extracted foreground is added back to the new background at block 628. It is then determined if all pixels have been examined at block 632. If so, then process terminates at block 640 and if not the next pixel is obtained and the process return to block 612.

Figure 7:
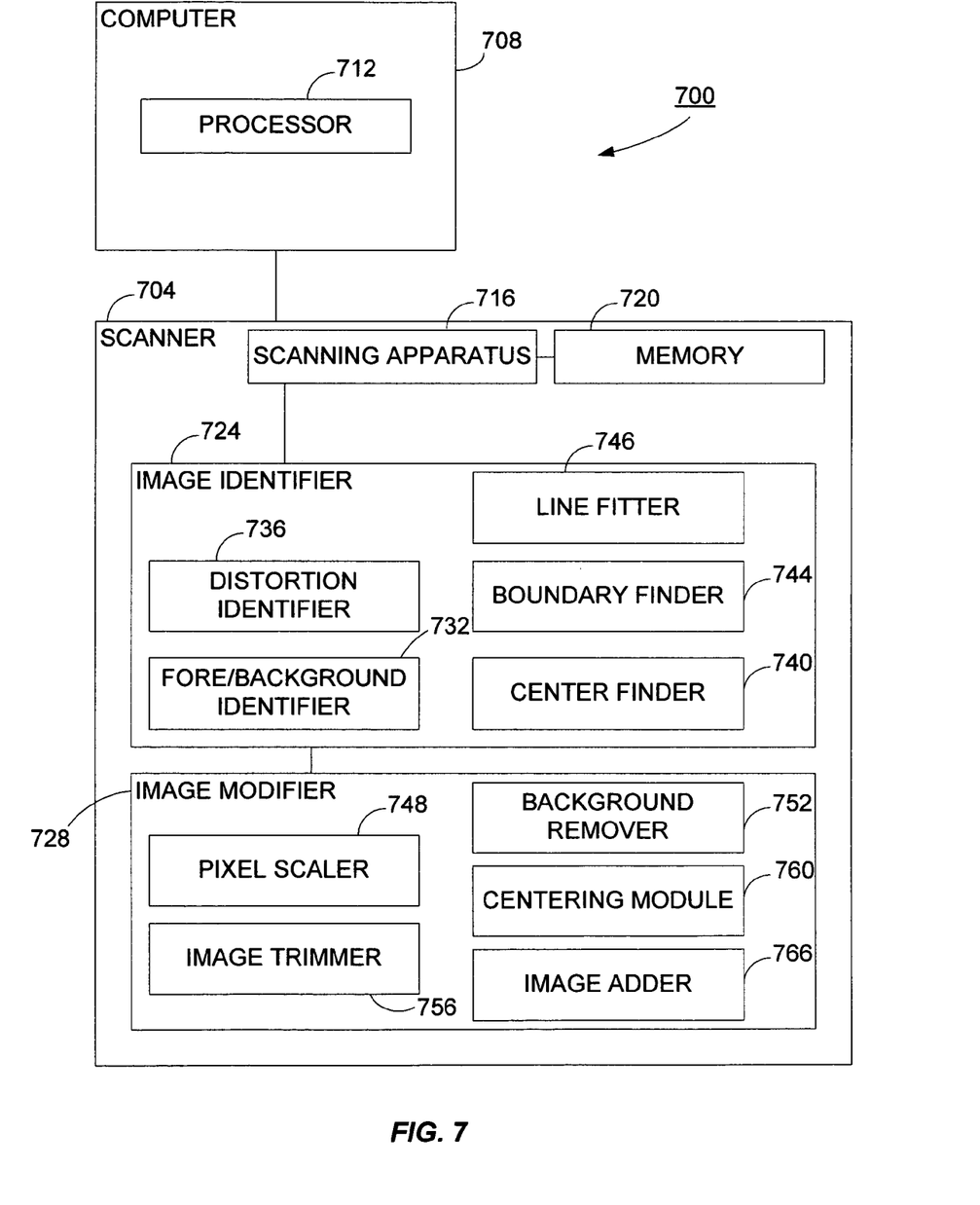
FIG. 7 shows an exemplary scanning system embodying the invention.

FIG. 7 shows an exemplary scanning system 700 embodying the invention. The scanning system 700 includes a scanner 704 that is coupled to a computer 708 having a processor 712. Although the scanner 704 is shown linked to the computer 708, the scanner 704 can also be a standalone unit having the processor 712 embedded therein. The scanner 704 has a scanning apparatus 716 and a memory 720. The scanning apparatus 716 can include CMOS image sensors ("CIS") or charge-coupled device ("CCD") for sensing or detecting an image, or other scanning or sensing apparatus such as strobe lights and the like that are used to acquire images or image data.

The scanner 704 also has an image identifier 724 and an image modifier 728. The image identifier 724 includes a plurality of modules. Upon receiving a scanned image from the computer 708, the memory 720, or the scanning apparatus 716, the image identifier 724 determines or identifies a plurality of image attributes of the scanned image. For example, the image identifier 724 includes a background identifier 732 that identifies a background value of each pixel in the scanned image. In some embodiments, the background value is determined in luminance values. Additionally, the image identifier 724 includes a distortion identifier 736 that determines a distortion amount for each line, an average distortion amount, and a final distortion amount that is used to modify the scanned image, as described earlier. The image identifier 724 also includes a centering module 740 that is used to determine a center of the scanned image, and a boundary finder 744 and a line fitter 746 that is used to determine the edges of the scanned image with edge estimation and best fit lines, as described in FIGS. 3 and 4. In some embodiments, the image identifier 724 and the image modifier 728 can be firmware based modules, hardware based modules, or software based modules.

The image modifier 728 receives a plurality of pixels of the scanned image from the memory 720, the distortion estimates, the background values and the like from the image identifier 724. Once the inputs have been received, the image modifier 728 uses a pixel scaler 748 to determine an amount of stretching required based on the amount of distortion determined earlier, as illustrated in FIG. 5. The image modifier 728 also includes a background remover 752 to remove the background of the scanned image, as described in FIG. 4 or FIG. 6. Thereafter, the image modifier 728 trims the scanned image with an image trimmer 756, and centers the trimmed image with a second centering module 760. In some embodiments, the scanner 704 can also include an image adder 766 such that when a foreground and a background have been identified, the foreground can be added to a new background.

Various features and advantages of the invention are set forth in the following claims.

The invention claimed is:

1. A method of scanning a bound document, the method comprising:
acquiring image data of the document, the image data having at least one image attribute;
identifying from the image data a group of image data having a first image attribute by a processor; and
modifying an entire group of identified image data having the first image attribute with a second image attribute by the processor, wherein identifying the group of image data comprises determining at least one of a local luminance minimum and a luminance drop.

2. The method of claim 1, wherein the first image attribute comprises a luminance value of the image data and the method further comprises determining a luminance value of the image data.

3. The method of claim 1, further comprising determining a plurality of boundaries of the image data.

4. The method of claim 1, further comprising determining a plurality of distortion estimates.

5. The method of claim 1, wherein modifying the group of image data further comprises removing the first image attribute from the group of image data.

6. The method of claim 1, further comprising stretching the group of image data with a stretching factor.

7. The method of claim 1, further comprising trimming the image data based on the identified image data.

8. The method of claim 1, further comprising centering the image data of the document following completion of the modifying.

9. The method of claim 8, further comprising printing the centered image data.

10. The method of claim 1, wherein identifying the group of image data further comprises classifying the image data as a background pixel when the image data has a luminance value at or above a luminance threshold, and the image data as a dark pixel when the image data has a luminance value below the luminance threshold.

11. The method of claim 1, further comprising:
extracting a foreground from the image data; and
adding the foreground to a second image background having the second image attribute.

12. The method of claim 1, wherein the modifying comprises extracting background data from the image data.

13. The method of claim 12, wherein the modifying comprises fixing distortions in the image data and stretching the image data upon an amount of distortions fixed.

14. A document scanner for scanning a bound document, the document scanner comprising:
image scanning apparatus configured to acquire image data of the document, the image data having at least one image attribute;
image identifier configured to identify from the image data a group of image data having a first image attribute; and
image modifier configured to modify an entire group of identified image data having the first image attribute with a second image attribute, wherein identifying the group of image data comprises determining at least one of a local luminance minimum and a luminance drop.

15. The scanner of claim 14, wherein the first image attribute comprises a luminance value of the image data, and wherein the image identifier further comprises a background identifier configured to determine a luminance value of the image data.

16. The scanner of claim 14, further comprising a boundary finder configured to determine a plurality of boundaries of the scanned image.

17. The scanner of claim 14, further comprising a distortion identifier configured to determine a plurality of distortion estimates.

18. The scanner of claim 14, further comprising a first image attribute remover configured to remove the group of image data.

19. The scanner of claim 14, further comprising an image data scaler configured to stretch the group of image data based on a stretching factor.

20. The scanner of claim 14, further comprising an image trimmer capable of trimming the image data based on the identified image data.

21. The scanner of claim 14, further comprising a center finder configured to find a center of the image data of the document.

22. The scanner of claim 14, wherein the first image attribute comprises a plurality of feature points indicating edges of the document, the scanner further comprising a line fitter capable of best-fitting the feature points.

23. The scanner of claim 14, wherein the image identifier further comprises a first image identifier configured to classify the image data as a background pixel when the image data has a luminance value at or above a luminance threshold and as a dark pixel when the image data has a luminance value below the luminance threshold.

24. The scanner of claim 14, wherein the image identifier further comprises a foreground identifier configured to identify a foreground from the image data, and wherein the image modifier further comprises an image adder configured to add the foreground to a second image background having the second image attribute.

25. A computer readable medium storing a document scanning software that when executed by a processor of an imaging device causes scanning of a bound document, the document scanning software comprising:
   image scanning software code configured to acquire image data of the document, the image data having at least one image attribute;
   image identifying software code configured to identify from the image data a group of image data having a first image; and
   image modifying software code configured to modify an entire group of identified image data having the first image attribute with a second image attribute, wherein identifying the group of image data comprises determining at least one of a local luminance minimum and a luminance drop.

26. The computer readable medium storing the document scanning software of claim 25, wherein the first image attribute comprises a luminance value of the image data, and wherein the image identifying software code further comprises background identifying software code configured to determine a luminance value of the image data.

27. The computer readable medium storing the document scanning software of claim 25, wherein the document scanning software further comprises boundary finding software code configured to determine a plurality of boundaries of the scanned image.

28. The computer readable medium storing the document scanning software of claim 25, wherein the document scanning software further comprises distortion identifying software code configured to determine a plurality of distortion estimates.

29. The computer readable medium storing the document scanning software of claim 25, wherein the document scanning software further comprises first image attribute removal software code configured to remove the group of image data.

30. The computer readable medium storing the document scanning software of claim 25, wherein the document scanning software further comprises image data scaling software code configured to stretch the group of image data based on a stretching factor.

31. The computer readable medium storing the document scanning software of claim 25, wherein the document scanning software further comprises image trimming software code capable of trimming the scanned image based on the identified image data.

32. The computer readable medium storing the document scanning software of claim 25, wherein the document scanning software further comprises a center finding software code configured to find a center of the image data of the document.

33. The computer readable medium storing the document scanning software of claim 25, wherein the first image attributes comprises a plurality of feature points indicating edges of the document, the scanning software further comprising line fitting software code capable of best-fitting the feature points.

34. The computer readable medium storing the document scanning software of claim 25, wherein the image identifying software code further comprises first image identifying software code configured to classify the image data as a background pixel when the image data has a luminance value at or above a luminance threshold and as a dark pixel when the image data has a luminance value below the luminance threshold.

35. The computer readable medium storing the document scanning software of claim 25, wherein the image identifying software code further comprises foreground identifying software code configured to identify a foreground from the image data, and wherein the image modifying software code further comprises image adding software code configured to add the foreground to a second image background having the second image attribute.

* * * * *